(12) United States Patent
Adams

(10) Patent No.: US 9,513,794 B2
(45) Date of Patent: *Dec. 6, 2016

(54) EVENT VISUALIZATION AND CONTROL

(71) Applicant: International Business Machines Corporation, Armonk, NY (US)

(72) Inventor: Tina M. Adams, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 389 days.

This patent is subject to a terminal disclaimer.

(21) Appl. No.: 14/066,903

(22) Filed: Oct. 30, 2013

(65) Prior Publication Data

US 2014/0157178 A1    Jun. 5, 2014

Related U.S. Application Data

(63) Continuation of application No. 13/691,156, filed on Nov. 30, 2012.

(51) Int. Cl.
   *G06F 3/0486*   (2013.01)
   *G06F 3/0484*   (2013.01)

(52) U.S. Cl.
   CPC .......... *G06F 3/0486* (2013.01); *G06F 3/0484* (2013.01); *G06F 2201/86* (2013.01); *G06F 2201/875* (2013.01)

(58) Field of Classification Search
   CPC .................... G06F 2201/865; G06F 2201/875
   USPC ........................................ 715/736, 772, 771
   See application file for complete search history.

(56) References Cited

U.S. PATENT DOCUMENTS

| 5,369,570 | A   | 11/1994 | Parad |
| 6,985,901 | B1  | 1/2006  | Sachse et al. |
| 8,151,206 | B2* | 4/2012  | Alimpich ............... G06F 3/0481 715/772 |
| 8,639,772 | B2  | 1/2014  | Gentile et al. |
| 2005/0060663 | A1* | 3/2005 | Arkeketa .............. G06F 11/321 715/810 |
| 2006/0041447 | A1* | 2/2006 | Vucina ................... G06Q 10/06 705/7.21 |
| 2007/0168861 | A1* | 7/2007 | Bell ....................... G06F 3/0481 715/701 |
| 2008/0126858 | A1  | 5/2008  | Barras |

(Continued)

OTHER PUBLICATIONS

Lunia, S., "User Interface for Efficient Visualization and Prioritization of Online Advertising," www.ip.com/pubview/IPCOM000159161D, Oct. 10, 2007.

IBM, "A Method to Evaluate and Visualize the Tab Navgaton Qualiy of a User Interface," http:/priorartdatabase.com/IPCOM/000193473, Feb. 25, 2010.

(Continued)

*Primary Examiner* — Matthew Ell
*Assistant Examiner* — Mohamed Abou El Seoud
(74) *Attorney, Agent, or Firm* — Convergent Law Group LLP

(57) ABSTRACT

A computer-implemented method for event visualization and control performed by a software component executing on a processor, comprises: receiving as input one or more events currently executing on a computer, the one or more events comprising both applications and processes, and user-initiated background events performed by the applications and processes; displaying a graphical user interface (GUI) showing the one or more events along a percent completion timeline, and dynamically updating the GUI such that each of the one or more events move through the percent completion timeline as the one or more events process; and providing interface controls that enable a user to dynamically perform actions on the one or more events, wherein the actions include start, stop, delete, pause, and reorder.

18 Claims, 7 Drawing Sheets

(56) References Cited

U.S. PATENT DOCUMENTS

| | | |
|---|---|---|
| 2008/0196006 A1 | 8/2008 | Bates et al. |
| 2011/0154286 A1 | 6/2011 | Schaw et al. |
| 2011/0261049 A1 | 10/2011 | Cardno et al. |
| 2011/0314424 A1* | 12/2011 | Gusmorino ......... G06F 3/04817 715/846 |
| 2012/0122066 A1* | 5/2012 | Dohring .................. G09B 7/02 434/308 |

OTHER PUBLICATIONS

Shrader, T.J.L., "User Interface for Database Command Line Applications," www.ip.com/pubview/IPCOM000108011D, Apr. 1, 1992.

Unger, A., "Visual Support for the Understanding of Simulation Processes," IEEE Pacific Visualization Symposium, pp. 57-64, 2009.

* cited by examiner

EVENT VISUALIZATION AND CONTROL

CROSS-REFERENCE TO RELATED APPLICATIONS

This application is a Continuation of patent application Ser. No. 13/691,156, filed Nov. 30, 2012, assigned to the assignee of the present application, and incorporated herein by reference.

BACKGROUND

A task manager is an application included with an operating system that allows the user to see processes currently running on a computer. The task manager may display information regarding running applications, including hidden programs that run on startup, and utilities. For example, the task manager included with Microsoft Windows™ displays detailed information in a task list regarding programs currently running on the computer. Running applications are displayed under an Applications tab and running processes are displayed under a Processes tab. The task manager may also display computer resource information such as CPU usage, memory information, network activity and logged-in users. The Applications tab also displays the status of each running application, e.g., running or not responding.

The task manager may also allow the user to take action respect to the running processes, such as to kill a running process or to create a new process. For example, while in the Applications tab, right-clicking any of the applications in the list provides the user with options to switch to that application, end the application, and show the process on the Processes tab that is associated with the application. Choosing the "End Task" option from the Applications tab causes a request to be sent to the application for it to terminate.

While in the Processes tab, right-clicking a process in the list provides the user with options to change the process's priority, set which CPU(s) the process can execute on, and end the process. Choosing to the "End Process" option causes Windows to kill the process. Choosing the "End Process Tree" option causes Windows to kill the process, as well as all processes started by that process.

While conventional task managers allow users to monitor concurrently running processes, conventional task managers do not enable the user to also monitor user initiated events associated with the running applications, which once initiated run in the background. Examples of such user-initiated events or tasks include save and copy, for instance. In addition, conventional task managers typically display running processes in table format and do not provide a rich visual experience for the user to easily monitor running process and to modify the running processes.

Accordingly, it would be desirable to provide an improved event processing visualization application.

BRIEF SUMMARY

The exemplary embodiment provides methods and systems for event visualization and control performed by a software component executing on a processor. Aspects of exemplary embodiment include receiving as input one or more events currently executing on a computer, the one or more events comprising both applications and processes, and user-initiated background events performed by the applications and processes; displaying a graphical user interface (GUI) showing the one or more events along a percent completion timeline, and dynamically updating the GUI such that each of the one or more events move through the percent completion timeline as the one or more events process; and providing interface controls that enable a user to dynamically perform actions on the one or more events, wherein the actions include start, stop, delete, pause, and reorder.

DETAILED DESCRIPTION

The exemplary embodiment relates to event handling visualization and control. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
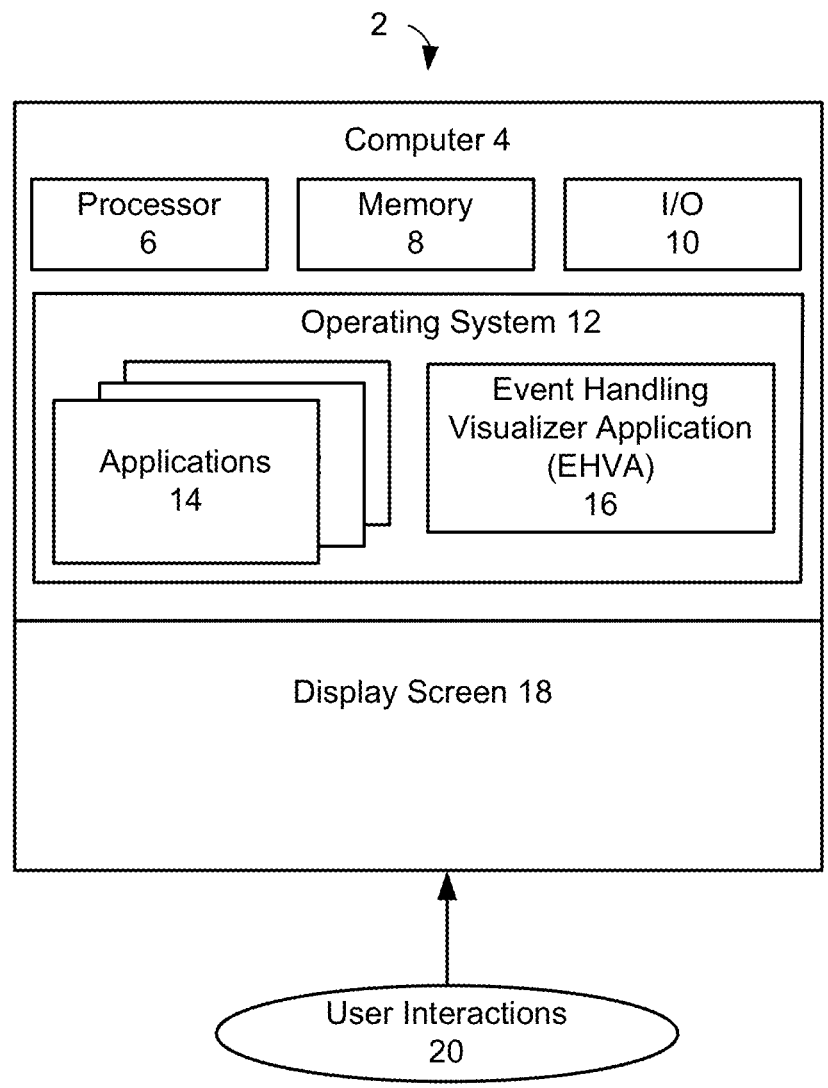
FIG. 1 is a logical block diagram illustrating an exemplary system environment for implementing one embodiment of an event processing visualization application.

FIG. 1 is a logical block diagram illustrating an exemplary system environment for implementing one embodiment of an event processing visualization application. The system 2 includes a computer 4 having at least one processor 6, a memory 8, input/output (I/O) 10, and a display screen 18 coupled together via a system bus (not shown). The computer 4 may exist in various forms, including, a tablet computer, a personal computer (e.g., desktop, laptop, or notebook), a set-top box, a game system, a smart or mobile phone, and the like. The computer 4 may include other hardware components of typical computing devices, including input devices, such as, a keyboard, pointing device, a microphone, buttons, touch screen, etc. (not shown), and output devices, such as speakers, and the like (not shown). The memory 8 may comprise various types of computer-readable media, e.g., flash memory, hard drive, optical disk drive, magnetic disk drive, and the like, containing computer instructions that implement the functionality disclosed when executed by the processor. The computer 4 may further include wired or wireless network communication interfaces for communication.

The processor 6 may be part of data processing system suitable for storing and/or executing software code, which may comprise an operating system 12 and various applications 14. The processor 6 may be coupled directly or indirectly to elements of the memory 8 through a system bus (not shown). The memory elements can include local memory employed during actual execution of the program code, bulk storage, and cache memories which provide temporary storage of at least some program code in order to reduce the number of times code must be retrieved from bulk storage during execution.

The input/output 10 or I/O devices can be coupled to the system either directly or through intervening I/O controllers. Network adapters (not shown) may also be coupled to the system to enable the data processing system to become coupled to other data processing systems or remote printers or storage devices through intervening private or public networks. Modems, cable modems and Ethernet cards are just a few of the currently available types of network adapters.

The operating system 12 and/or the applications 14 (such as a web browser, a word processor, a photo/movie editor, and the like) are hereinafter referred to as "the software". During execution of the software, events may be generated corresponding to programs and processes running on the computer 4 which may comprise operating system 12 processes and application 14 program processes. Depending on the operating system 12, a process may be made up of multiple threads of execution that execute instructions concurrently. As used herein, the term events may also include user-initiated background events performed by the applications and processes, such as a copy and paste operation, for example.

Users may monitor details about programs and processes running on a computer using a conventional task manager. However conventional task managers typically only list the running programs and processes in table format and do not allow the user to monitor user-initiated background events.

According to the exemplary embodiment, the computer 4 executes an event handler visualizer application (EHVA) 16 that provides the user with event visualization and control over the events. The EHVA 16 displays a graphical user interface (GUI) that shows concurrently running events as graphical representations on a dynamically updated percent complete timeline. The EHVA 16 also provides interface controls that allow the user to perform an expanded set of actions on the events, as described below.

Figure 2:
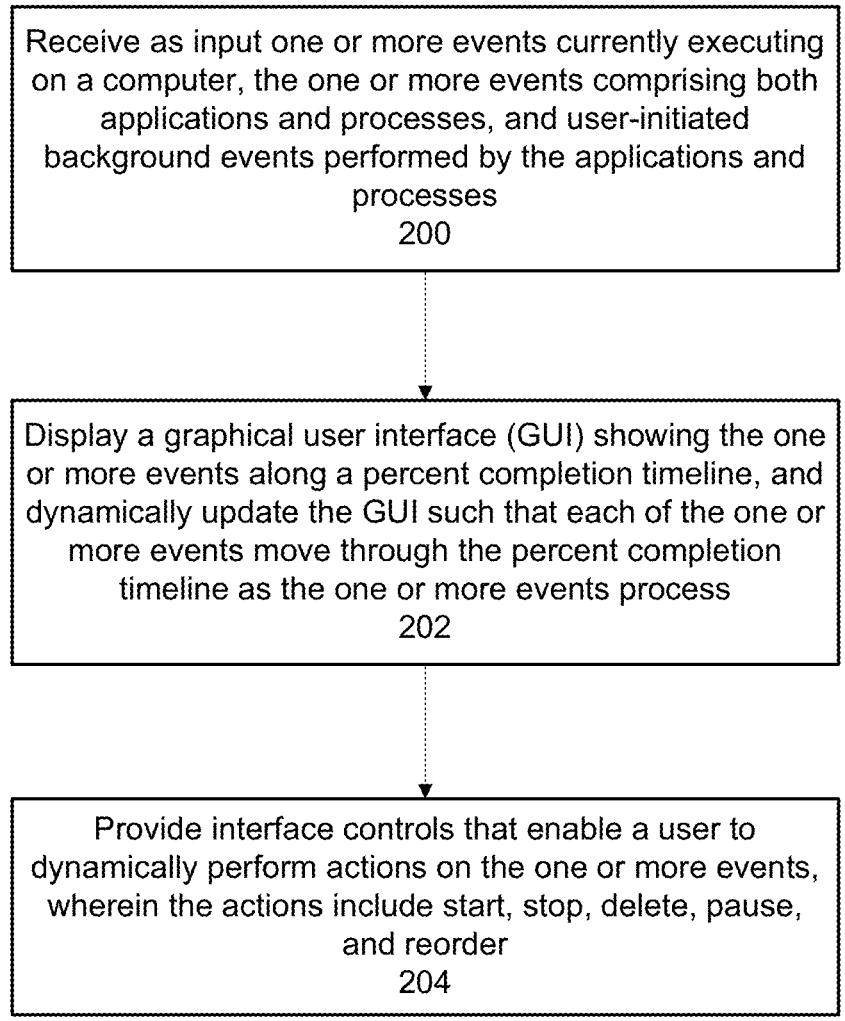
FIG. 2 is a flow diagram illustrating one embodiment of a process for event visualization and control.

FIG. 2 is a flow diagram illustrating one embodiment of a process for event visualization and control. The process may begin by the EHVA receiving as input one or more events currently executing on a computer, the one or more events comprising both applications and processes, and user-initiated background events performed by the applications and processes (block 200).

At open of the EHVA 16, the EHVA 16 may perform a system scan of all currently running events (e.g., processes and applications) and monitor initiation of new events. In one embodiment, the EHVA 16 may retrieve a list of events from the operating system 12 (e.g., Microsoft Task Manager events) and/or directly from the applications and processes, including user-initiated background events. Examples of user-initiated background events include operation such as Copy, Move, Upload, Download, Convert File, and the like). The EHVA 16 may also retrieve corresponding metadata about the events, immediately catalog the events, and assign each of the events a graphical representation, such as an icon, based on event type.

The EHVA 16 displays a graphical user interface (GUI) showing the one or more events along a percent completion timeline, and dynamically updates the GUI such that each of the one or more events move through the percent completion timeline as the one or more events process (block 202).

Figure 3A:
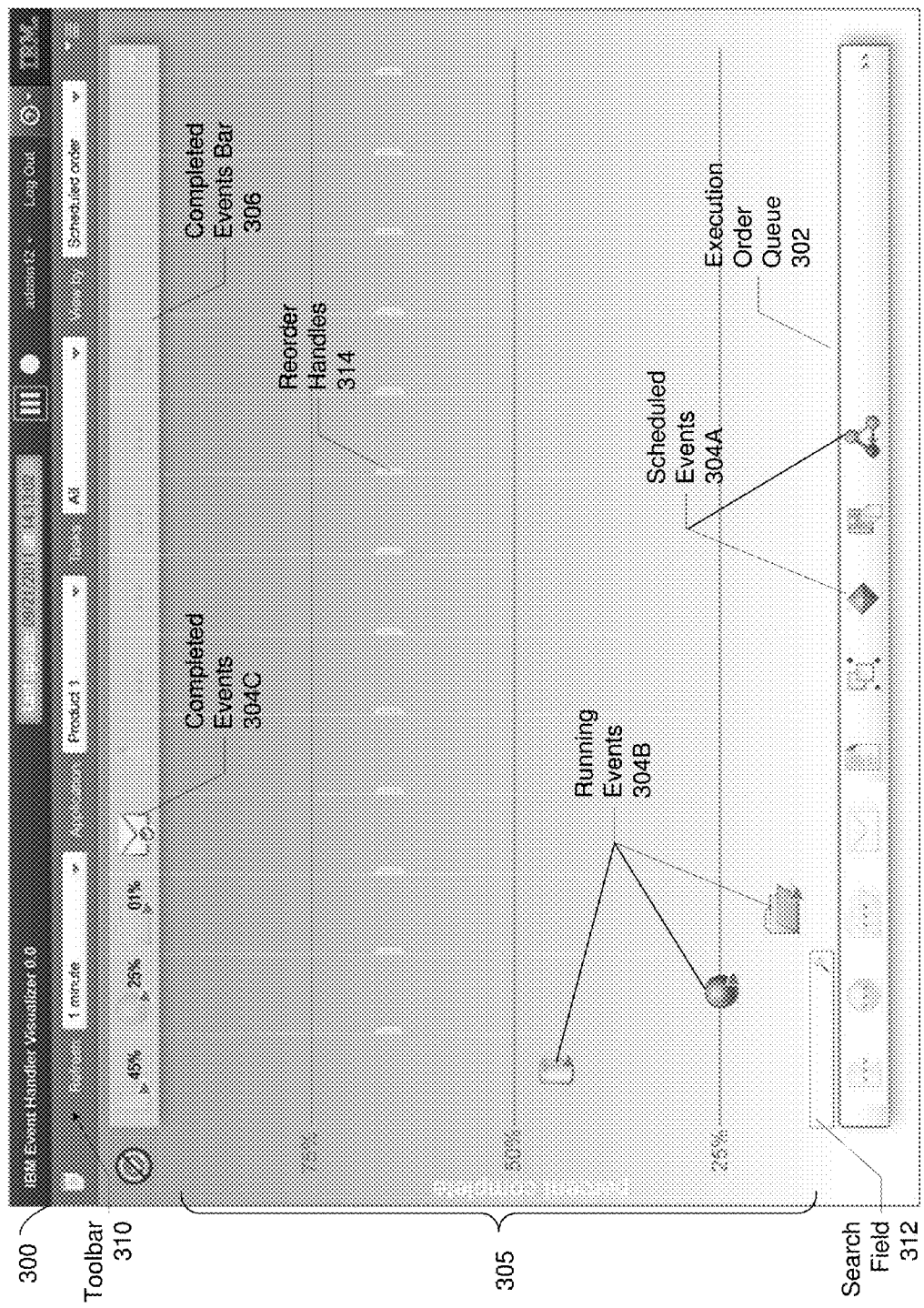
FIGS. 3A and 3B are diagrams illustrating example embodiments for an event handling visualization screen of the GUI displayed by the event handling visualization application (EHVA).
Figure 3B:
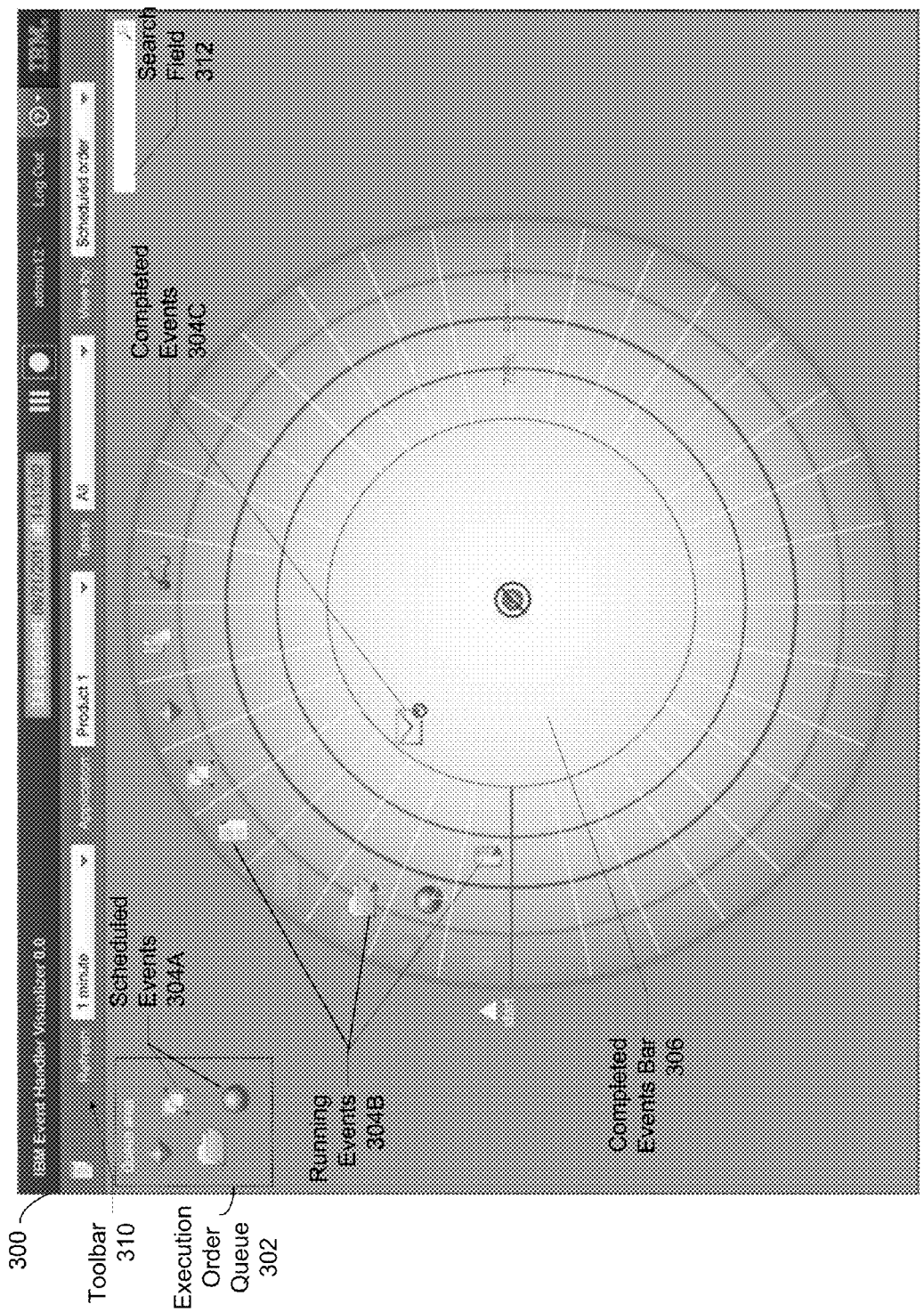

FIGS. 3A and 3B are diagrams illustrating example embodiments for an event handling visualization screen of the GUI displayed by the event handling visualization application 16, where like reference numerals have like reference numbers. In one embodiment, the event handling visualization screen 300 comprises an execution order queue 302, a percent completion timeline 305, a completed events bar 306, a toolbar 310 and a search field 312.

According to the exemplary embodiment, the percent completion timeline 306 is displayed between the execution order queue 302 and the completed events bar 306. For example, FIG. 3A shows the execution order queue 302 displayed in a rectangular graph format, with the execution order queue 302 and the completed events bar 306 displayed on opposite sides of the percent completion timeline 305. In the example shown, the execution order queue 302 is displayed at the bottom the percent completion timeline 305 and the completed events bar 306 displayed at the top. However, in another embodiment, the execution order queue 302 may be displayed above the percent completion timeline 305, while the completed events bar 306 may be displayed below the percent completion timeline 305.

FIG. 3B shows the percent completion timeline 306 displayed in a sphere format, with the execution order queue 302 is displayed outside of the percent completion timeline 305, and the completed events bar 306 is displayed in the center of the percent completion timeline 306.

In both embodiments shown in FIGS. 3A and 3B, events scheduled for execution are first displayed in the execution order queue 302 as schedule events 304A. During execution, the events are dynamically moved through the percent completion timeline 305 toward the completed events bar 306 as running events 304B, and after completion are displayed in the completed events bar 306 as completed events 304C. As used herein, the scheduled events 304A, the running events 304B, and the completed events 304C, are collectively referred to as events 304.

In one embodiment, the execution order queue 302 displays scheduled events 304A such that the placement order of the scheduled events 304A indicates the execution priority of the scheduled events 304A. In the embodiments shown, scheduled events 304A in the front (left side) of the execution order queue 302 have higher priority than those in the back of the execution order queue 302.

When the computer begins to execute/process/run each of the scheduled events 304A, the EHVA 16 removes the scheduled events 304A from the execution order queue 302 and displays the scheduled events 304A as running events 304B on the percent completion timeline 305.

In one embodiment, the EHVA 16 displays the percent completion timeline 305 with rows demarking percent of completion levels from zero percent to one hundred percent, and columns configured as paths of movement for the running events 304B. In one embodiment, the percent completion timeline 305 may include rows indicating "0%-25%", "25%-50%", and "75%-100%". In one embodiment, graphical representations of the running events 304B may be moved along their respective columns of the percent completion timeline 305 using discrete increments or using smooth animation. In another embodiment, colors may also be used to indicate changes to the percent completion of the events. In one embodiment, a textual representation of the progress in percent format may also be displayed for each column. In the example of FIG. 3A, the textual representation of the progress is shown displayed in the columns of the completed events bar 306.

According to the exemplary embodiment, motion of the running events 304B along the columns of the percent completion timeline 305 visualizes for the user process progression of the running events 304B both individually and in relation to one another.

Referring again to FIG. 2, the EHVA 16 further provides interface controls that enable a user to dynamically perform actions on the one or more events, wherein the actions include start, stop, delete, pause, and reorder (block 204).

Figure 4:
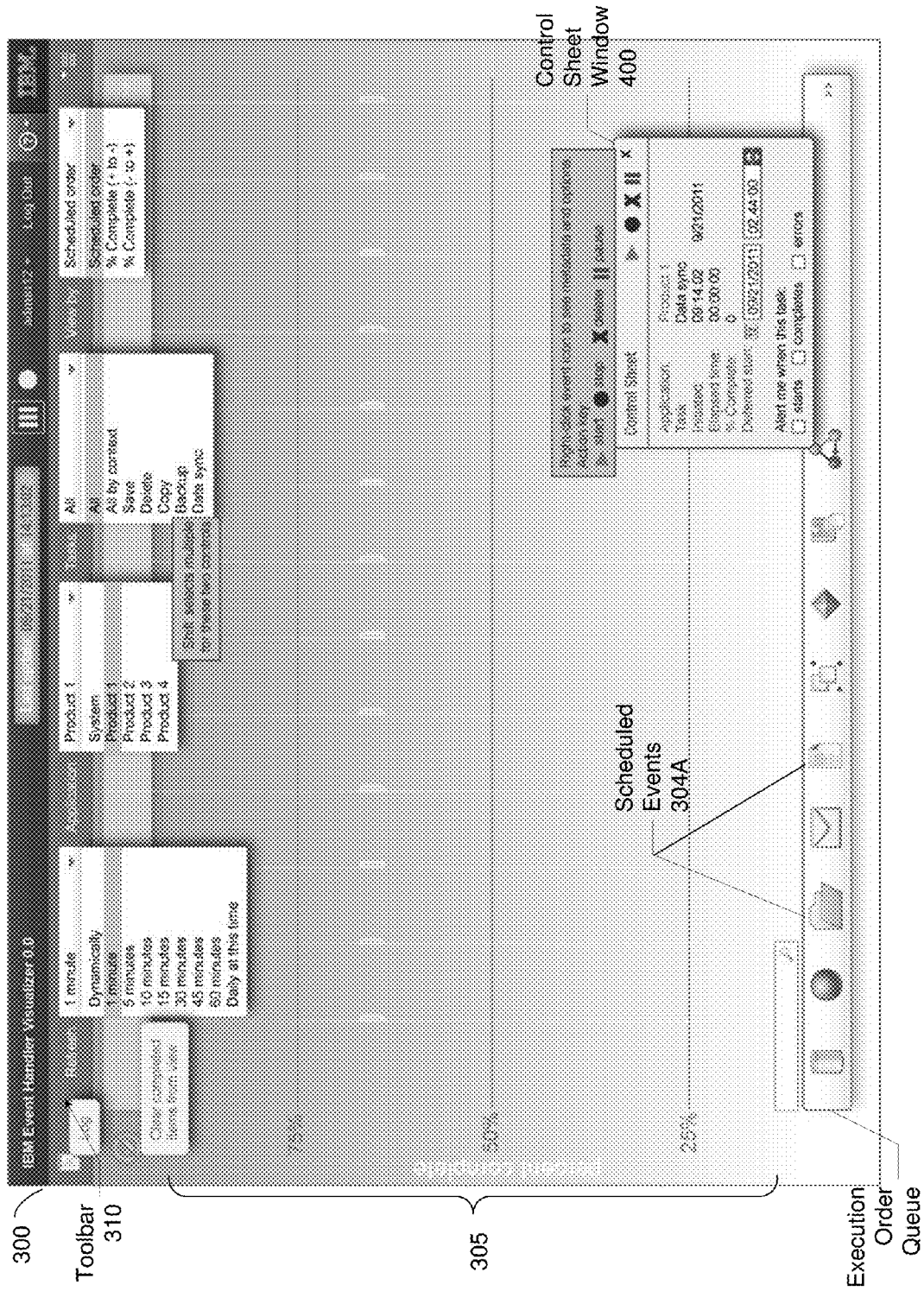
FIG. 4 is a diagram illustrating interface controls for allowing the user to dynamically perform actions on the events as well as functions of the toolbar of the event handling visualization screen.

FIG. 4 is a diagram illustrating interface controls for allowing the user to dynamically perform actions on the events as well as functions of the toolbar of the event handling visualization screen. In one embodiment, only one of the interface controls may be revealed at a time based on user clicks. Responsive to the user selecting an event 304, e.g., by right clicking, a pop-up control sheet window 400 may be displayed showing the actions may be performed. In the example shown, the control sheet window 400 displays interface controls in the form of icons and/or text for start, stop, delete, and pause. In a further embodiment, the control sheet window 400 may also display an interface control for allowing the user to configure a delayed start for the event.

FIG. 4 also displays functions of the toolbar 310, which include interface controls that allow the user to select one or more of: a screen refresh rate, filter events by the applications, a type of task, and view by options.

Referring again to FIGS. 3A and 3B, interface controls for allowing the user to perform a reorder may include reorder handles 314 displayed in each column of the percent completion timeline 305, which the user can move to change the order of the columns; and enabling the user to perform a "drag-and-drop" operation on any of the scheduled events 304A displayed in the execution order queue 302 to change positional order of the execution order queue 302. For example, assume that an event for report generation has become the highest priority but is very far down in the execution order queue 302. In this case, the user can drag-and-drop the icon for the report generation event to the front of the execution order queue 302 for expedited processing.

Figure 5:
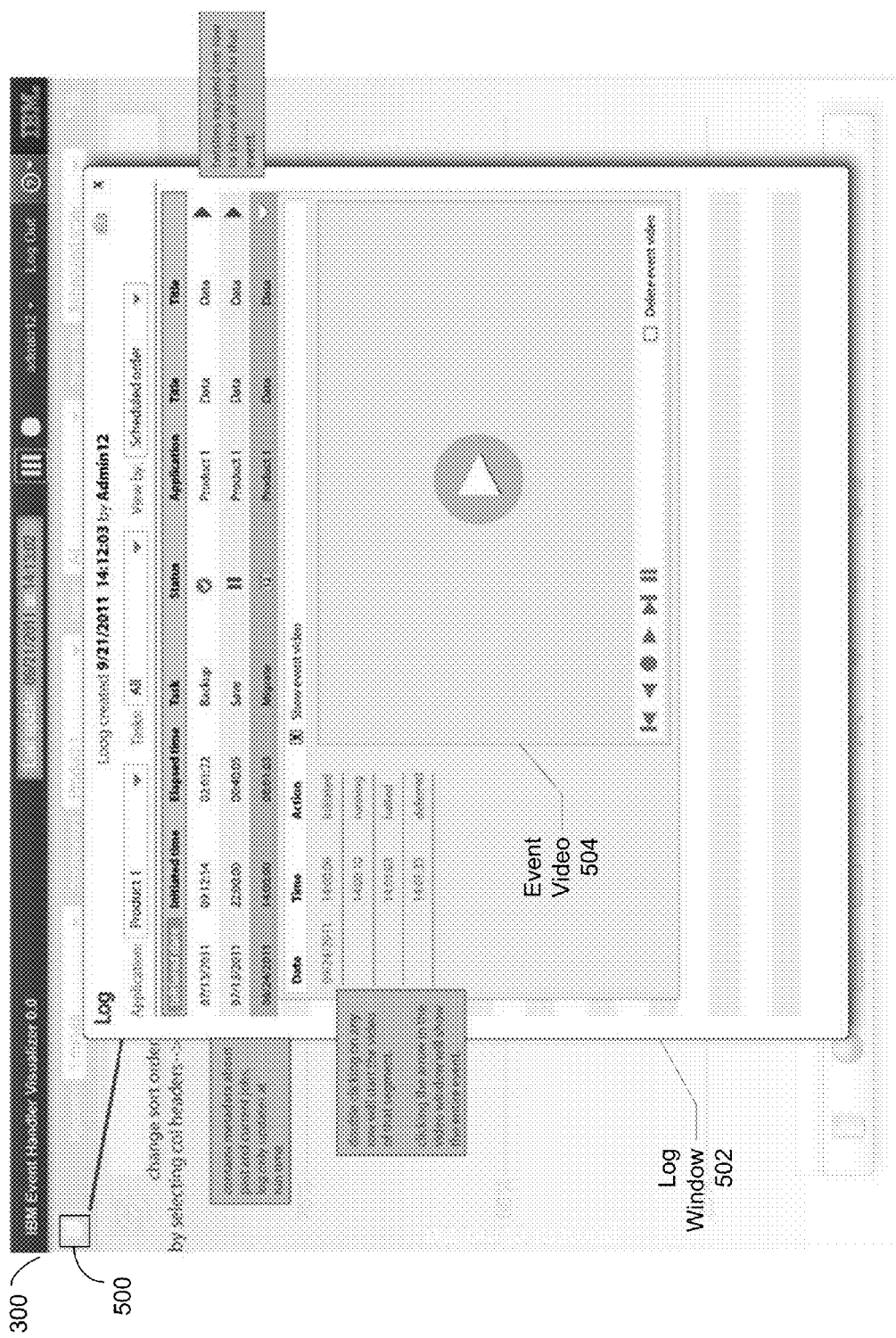
FIG. 5 is a diagram illustrating the event reporting function of the EHVA.

In a further embodiment, the EHVA 16 is configured to perform event logging and reporting functions. FIG. 5 is a diagram illustrating the event reporting function of the EHVA 16. In response to the user clicking a log interface control, such as a log icon 500 from the event visualization screen 300, a log window 502 showing attributes of past and current events may be displayed. In one embodiment, the events are displayed in rows of a table where columns of the table represent the attributes, such as initiated date, initiated time, elapsed time, task, status, application, title, and the like. The user may change the sort order of the log window 502 by selecting control headers such as application, tasks, and view by. In one embodiment, each row of events may be expanded to display a progress history of that the event, including an event video 504.

Figure 6:
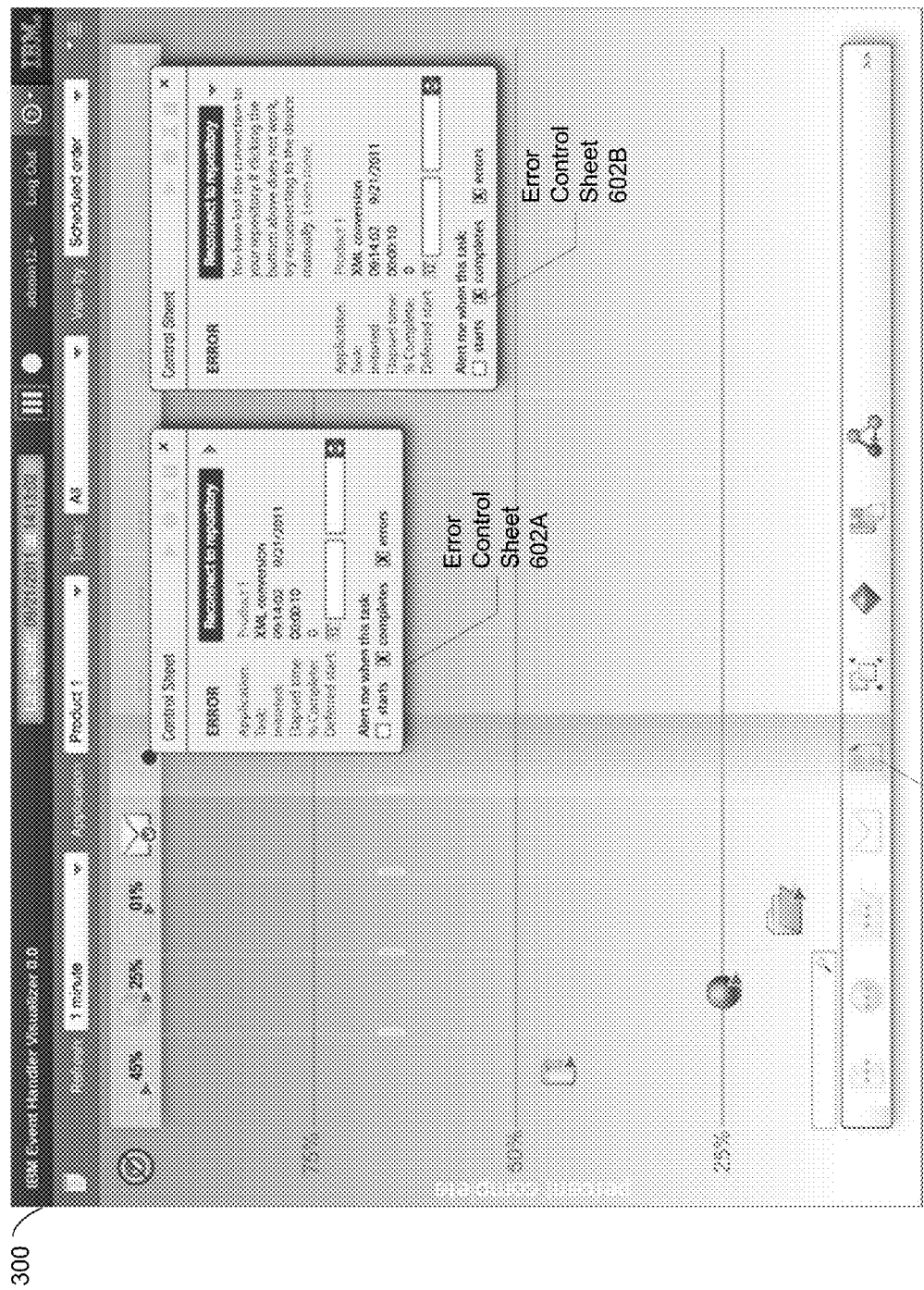
FIG. 6 is a diagram illustrating the event error handling function of the EHVA.

In yet a further embodiment, the EHVA 16 is configured to perform event error handling functions. FIG. 6 is a diagram illustrating the event error handling function of the EHVA 16. In response to detecting that an event 600 has experienced in error, the EHVA 16 may display the column of the percent completion timeline corresponding to the event 600 in a different color (e.g., red), and an error control sheet window 602A may be displayed listing attributes of the error. Examples of the attributes displayed in the error control sheet 602A may include the type of error, the application, the task, the time initiated, elapsed time, percent complete, and user configurable alerts. In response the user clicking on a control in the error control sheet 602A, possible remedies for the error be displayed to the user, as shown in error control sheet 602B.

The event handling visualizer application 16 of the exemplary embodiment is capable of monitoring each individual concurrent process within an application (e.g., Save, Copy, Web Push, and the like.), which is an improvement over conventional system-based task managers that monitor activity only at an application level as a combined processing of multiple events until the last concurrent event has completed, but not each unique concurrent event within each application. The EHVA 16 allows the user to not only view these individual concurrent unique events within a single application, but to also modify and reorder processing of the events.

A method and system for event visualization and control have been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A computer-implemented method for event visualization and control, the process performed by a software component executing on a processor, comprising:
   receiving as input one or more events currently executing on a computer, the one or more events comprising both applications and processes, and user-initiated background events performed by the applications and processes, wherein the user-initiated background events comprise operations including Copy, Paste, Move, Save, Upload, Download, and Convert File;
   displaying a graphical user interface (GUI) showing the one or more events along a percent completion timeline, and dynamically updating the GUI such that each of the one or more events move through the percent completion timeline as the one or more events process, wherein the GUI displays the percent completion timeline between an execution order queue and a completed events bar, wherein the events scheduled for execution are first displayed in the execution order queue as scheduled events, and during execution, are then simultaneously displayed on the percent completion timeline and are dynamically moved through the percent completion timeline as running events, and after completion, are displayed in the completed events bar as completed events, and wherein the percent completion timeline is displayed with rows demarking percent of completion levels from zero percent to one hundred percent, and columns configured as paths of movement for the running events; and
   providing interface controls that enable a user to dynamically perform actions on the one or more events, wherein the actions include start, stop, delete, pause, and reorder.

2. The method of claim 1 further comprising displaying the percent completion timeline in a rectangular format with the execution order queue and the completed events bar displayed on opposite sides of the percent completion timeline.

3. The method of claim 1 further comprising displaying the percent completion timeline in a sphere format with the execution order queue displayed outside of the percent completion timeline, and the completed events bar displayed in a center of the percent completion timeline.

4. The method of claim 1 wherein a placement order of the scheduled events in the execution order queue indicates an execution priority of the scheduled event.

5. The method of claim 1 further comprising displaying the percent completion timeline with rows demarking percent completion levels and columns configured as paths of movement for the running events.

6. The method of claim 1 wherein receiving as input one or more events further comprises: the software component performing a system scan of all currently running events and monitoring initiation of new events.

7. The method of claim 6 further comprising: retrieving corresponding metadata about the events, cataloging the events, and assigning each of the events a graphical representation based on event type.

8. The method of claim 1 wherein providing interface controls further comprises one or more of:
   displaying a toolbar that allows the user to select view options;
   displaying a log interface control for enabling the user to perform event logging and reporting functions; and
   responsive to detecting that one of the events has experienced an error, displaying a window listing attributes of the error.

9. The method of claim 1 wherein the interface controls for allowing the user to perform the reorder include at least one of: reorder handles displayed the percent completion timeline that allow the user to change in order of the columns; and enabling the user to perform a drag-and-drop operation on any of the events displayed in the execution order queue.

10. A non-transitory computer-readable medium containing program instructions for event visualization and control, the program instructions for:
    receiving as input one or more events currently executing on a computer, the one or more events comprising both applications and processes, and user-initiated background events performed by the applications and processes, wherein the user-initiated background events comprise operations including Copy, Paste, Move, Save, Upload, Download, and Convert File;
    displaying a graphical user interface (GUI) showing the one or more events along a percent completion timeline, and dynamically updating the GUI such that each of the one or more events move through the percent completion timeline as the one or more events process, wherein the GUI displays the percent completion timeline between an execution order queue and a completed events bar, wherein the events scheduled for execution are first displayed in the execution order queue as scheduled events, and during execution, are then simultaneously displayed on the percent completion timeline and dynamically moved through the percent completion timeline as running events, and after completion, are displayed in the completed events bar as completed events, and wherein the percent completion timeline is displayed with rows demarking percent of completion levels from zero percent to one hundred percent, and columns configured as paths of movement for the running events; and
    providing interface controls that enable a user to dynamically perform actions on the one or more events, wherein the actions include start, stop, delete, pause, and reorder.

11. The computer-readable medium of claim 10 further comprising program instructions for displaying the percent completion timeline in a rectangular format with the execution order queue and the completed events bar displayed on opposite sides of the percent completion timeline.

12. The computer-readable medium of claim 10 further comprising program instructions for displaying the percent completion timeline in a sphere format with the execution order queue displayed outside of the percent completion timeline, and the completed events bar displayed in a center of the percent completion timeline.

13. The computer-readable medium of claim 10 wherein a placement order of the scheduled events in the execution order queue indicates an execution priority of the scheduled event.

14. The computer-readable medium of claim 10 further comprising program instructions for displaying the percent completion timeline with rows demarking percent completion levels and columns configured as paths of movement for the running events.

15. The computer-readable medium of claim 10 wherein receiving as input one or more events further comprises: the software component performing a system scan of all currently running events and monitoring initiation of new events.

16. The computer-readable medium of claim 15 further comprising program instructions for: retrieving corresponding metadata about the events, cataloging the events, and assigning each of the events a graphical representation based on event type.

17. The computer-readable medium of claim 10 wherein the program instructions for providing interface controls further comprises program instructions for one or more of:
    displaying a toolbar that allows the user to select view options;
    displaying a log interface control for enabling the user to perform event logging and reporting functions; and
    responsive to detecting that one of the events has experienced an error, displaying a window listing attributes of the error.

18. The computer-readable medium of claim 10 wherein the interface controls for allowing the user to perform the reorder include at least one of: reorder handles displayed the percent completion timeline that allow the user to change in order of the columns; and enabling the user to perform a drag-and-drop operation on any of the events displayed in the execution order queue.

* * * * *